Nov. 28, 1967  J. R. HORNADAY  3,355,178
SEAL ASSEMBLY
Filed Nov. 23, 1964  2 Sheets-Sheet 1
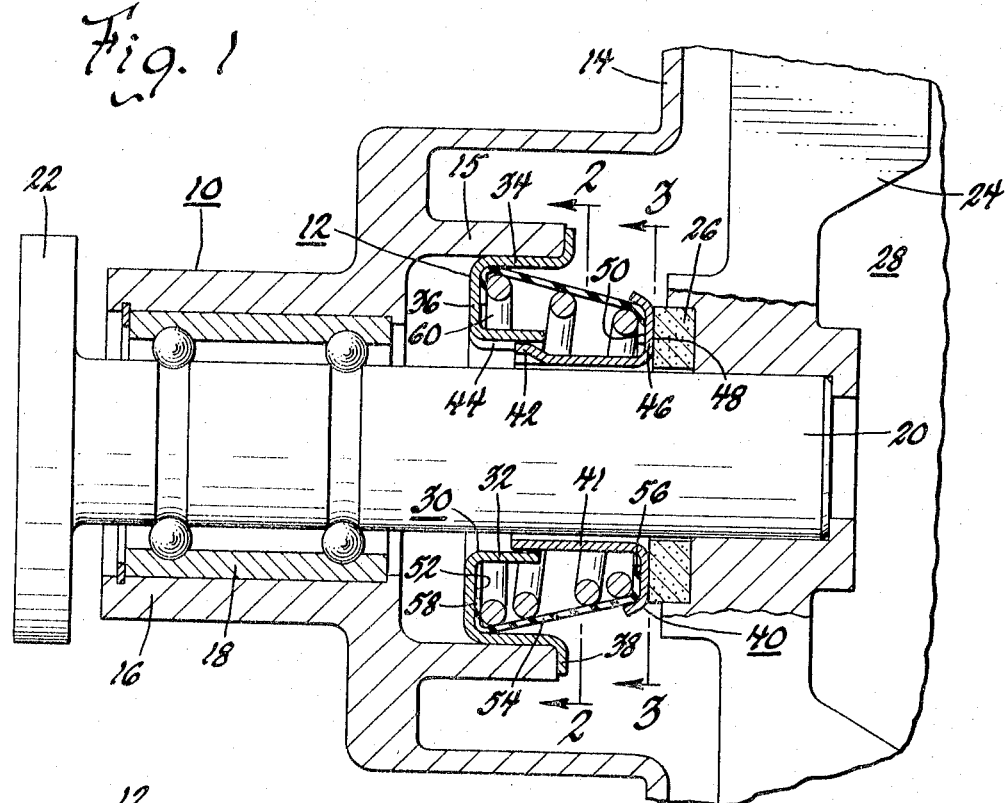
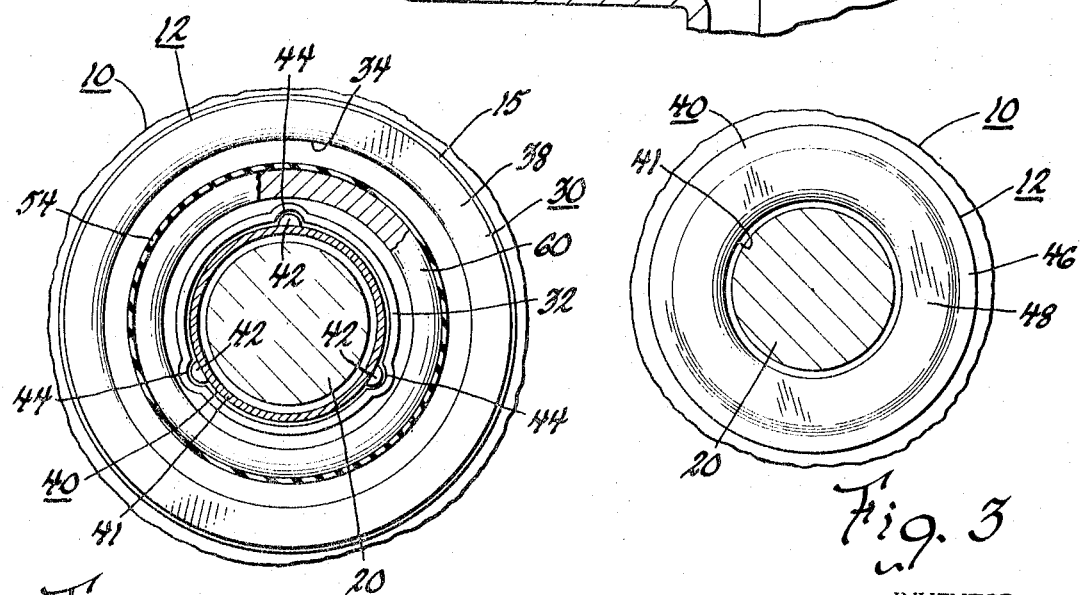
INVENTOR.
James R. Hornaday
BY
J. C. Evans
HIS ATTORNEY Nov. 28, 1967   J. R. HORNADAY   3,355,178
SEAL ASSEMBLY
Filed Nov. 23, 1964   2 Sheets-Sheet 2

INVENTOR.
James R. Hornaday
BY
J. C. Evans
HIS ATTORNEY

United States Patent Office 3,355,178
Patented Nov. 28, 1967

3,355,178
SEAL ASSEMBLY
James Robert Hornaday, Dayton, Ohio, assignor to General Motors Corporation, Detroit, Mich., a corporation of Delaware
Filed Nov. 23, 1964, Ser. No. 412,949
1 Claim. (Cl. 277—87)

This invention relates to rotary mechanical seals and more particularly to assemblies for sealing relatively rotatable members.

Present day manufacturing and assembly techniques require a certain amount of interchangeability of sub-assemblies between different product lines. For example, in certain industries a supplier may produce a rotary seal sub-assembly used in automotive water pumps and like units in washing machines or other domestic appliances for sealing against leakage along a rotary shaft therein. Such seal assemblies, therefore, preferably should have unusually good sealing characteristics suited for a wide range of applications. Furthermore, they should be economical and producible by mass production methods.

An object of the present invention therefore is to improve rotary seal assemblies for sealing between a fixed housing and a rotary shaft by means of an economical unitary structure including telescoped, stamped sheet metal housing members having means thereon for interlocking against relative rotative movement and wherein one of said members has a radially directed integral sealing seat or surface adapted to be sealingly slidably engaged with an economical carbon ring sealing member on the rotary shaft whereby a highly effective sealing action is obtained that is suited for a wide range of applications.

Further objects and advantages of the present invention will be apparent from the following description, reference being had to the accompanying drawings wherein preferred embodiments of the present invention are clearly shown.

In the drawings:

FIGURE 1 is a view in vertical section of a part of a water pump assembly including the seal assembly of the present invention;

FIGURE 2 is a view in vertical section taken along the line 2—2 of FIGURE 1;

FIGURE 3 is a view in vertical section taken along the line 3—3 of FIGURE 1;

Figure 4:
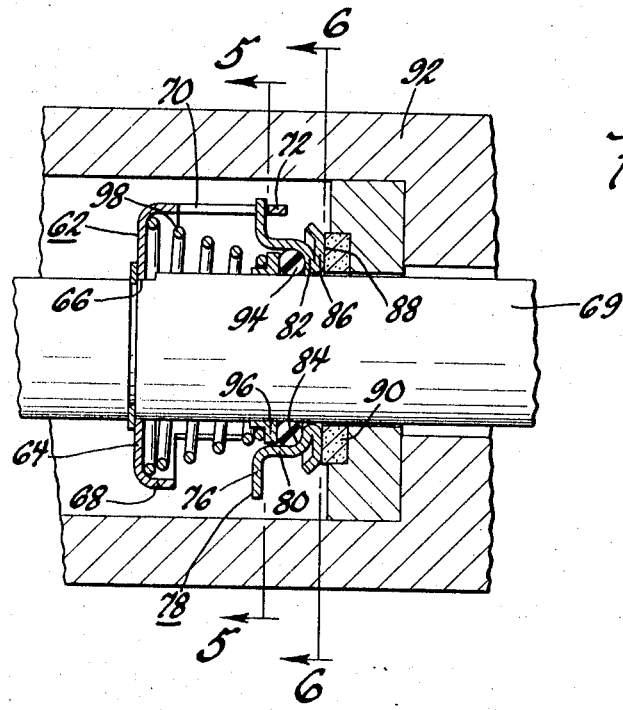
FIGURE 4 is a view in vertical section of another embodiment of the present invention.

Referring now to FIGURE 1 of the drawings, a water pump assembly 10 is illustrated including a mechanical rotary seal assembly 12 constructed in accordance with certain of the principles of the present invention. The water pump assembly 10 is merely representative of a typical environment suitable for association with the assembly 12 with it being understood that the assembly 12 is equally suited for use in automatic washing machines or the like of the type having a drive shaft extending into a fluid containing tub or the like.

The water pump 10 illustrated in FIGURE 1 more particularly includes a cover 14 having an inwardly directed tubular extension 15 and an outwardly directed tubular extension or neck 16 serving to support a bearing assembly 18 that rotatably supports a shaft 20 having one end thereof connected to a driven hub 22 and the opposite end thereof connected to a rotary water pump impeller 24. In the illustrated arrangement, the impeller 24 includes an annular carbon ring element 26 mounted in the outboard face thereof in sealing engagement with the innermost end of the seal assembly 12 for sealing against fluid leakage exteriorly of a pump chamber 28 formed in part by the cover 14.

The improved seal assembly 12 more particularly includes a first stamped sheet metal housing portion 30 having an inwardly directed tubular extension 32 and an annular outer housing portion 34 in spaced relationship therewith joined thereto by an annular end member 36. The annular outer portion 34 is supportingly received within the tubular inwardly directed cover extension 15 in a press fit relationship to prevent relative rotary movement therebetween. The outer annular housing portion 34 also has the end thereof bent radially outwardly at 38 to engage the end of the extension 15 to axially index the assembly 12 with respect to the cover 14.

On the opposite end of the assembly 12 is a second stamped sheet metal housing portion 40 having an inwardly directed tubular extension 41 that is partially telescoped within the extension 32 as best illustrated in FIGURE 1. The extension 41 includes a plurality of radially outwardly directed, circumferentially spaced ribs 42 on the end thereof that are slidably received by grooves 44 formed in extension 32 to prevent relative rotation between the end housing portions 32, 41. The housing portion 40 also includes a radially outwardly directed end portion 46 connected to the tubular extension 41 to form an inwardly located seat or surface 48 adapted to sealing engage the carbon ring 26.

In accordance with certain of the principles of the present invention, the inner housing member 40 preferably is formed of a ductile stainless steel so that the tubular portion 41, ribs 42 and inner end portion 46 can be formed by an inexpensive stamping operation during which time the outer peripheral edge of portion 46 can be turned inwardly to form a annular recess 50 facing opposite to an annular recess 52 in the outer housing member 30. In the process an integral sealing face such as surface 48 is formed on the inner housing member 40 which, preferably, in a domestic washing machine application is lapped to have a smoothness of a maximum 4 monochromatic light bands. It has been found that such a surface of stainless steel forms an unexpectedly improved sealing action when in relative rotary sliding sealing engagement with a carbon sealing ring such as ring 26.

In accordance with certain other principles of the present invention, a diaphragm member 54 of a suitable resilient material such as rubber is located between the inner and outer housing members 30, 40 with an inwardly turned edge 56 on one end thereof being received within the annular recess 50 and a larger diameter inner inwardly turned edge 58 on the opposite end thereof being received within the annular recess 52. The inwardly turned ends 56, 58 are preferably fastened to the surfaces forming the recesses 50, 52 as, for example, by adhering them thereto with a suitable epoxy resin or other like cementing material. Additionally, a conically shaped compression spring 60 is located within the diaphragm member 54 so that the opposite ends thereof are in engagement with the inner surfaces of the ends 56, 58 to produce a further retention of the diaphragm 54 within the seal assembly 12.

The spring 60 additionally serves to bias the inner housing member 40 interiorly of the pumping chamber 28 so that the smooth sealing surface 48 thereon is continually maintained in a good running seal relationship with ring 26 whereby a positive sealing action is produced to prevent fluid leakage exteriorly of the pumping chamber 28 outwardly thereof along the shaft 20.

Another embodiment of the present invention is illustrated in FIGURE 4 as including a first stamped sheet metal housing portion 62 like outer housing portion 29 that has an end surface 64 with a central opening 66 therethrough with the outer edge 68 thereof bent inwardly to form a continuously large diameter annular recess. In this representative arrangement a rotary shaft 69 is directed through opening 66 where it is fixedly secured to surface 64. A plurality of circumferentially spaced ribs 70 having one end thereof connected to the edge 68 are directed inwardly of the end surface 64 and each includes a crossed end portion 72.

Each of the ribs 70 is received within an opening 74 formed at circumferentially spaced points in a radially outwardly directed annular end 76 of a stamped sheet metal inner housing member 78. The radially outwardly directed end 76 thereby coacts with the ribs 70 to interlock the outer and inner housing members 62, 78 for rotation with shaft 69 and serves to align such members for relative axial movement limited by the cross end 72 on each of the ribs 70. The inner housing member 78 more particularly includes a tubular portion 80 having one end thereof connected to the radially outwardly directed end 76 and the opposite end thereof bent radially inwardly at 82 for forming an inwardly facing annular recess 84. The opposite end then is bent radially outwardly at 86 into axial juxtaposition with itself to thereby form an inwardly facing reinforced sealing seat or surface 88 of an annular form that is adapted to sealingly engage carbon ring seal member 90 that is fixed within a fixed tubular member 92 surrounding the seat assembly and rotary shaft 69. The member 92 can be, for example, a nose or outwardly directed extension on the head of a refrigerant compressor of the type shown in U.S. Patent 2,907,426 issued Oct. 6, 1959 to J. W. Jacobs.

In this embodiment of the invention both the inner and outer housing members 62, 78 are preferably formed of a ductile stainless steel whereby the interlocking portions thereof and an end face can be formed by a relatively inexpensive stamping operation which results in an integral smooth sealing seat or surface such as 88 which in one working embodiment was lapped to have a smoothness of one monochromatic light band.

Figure 5:
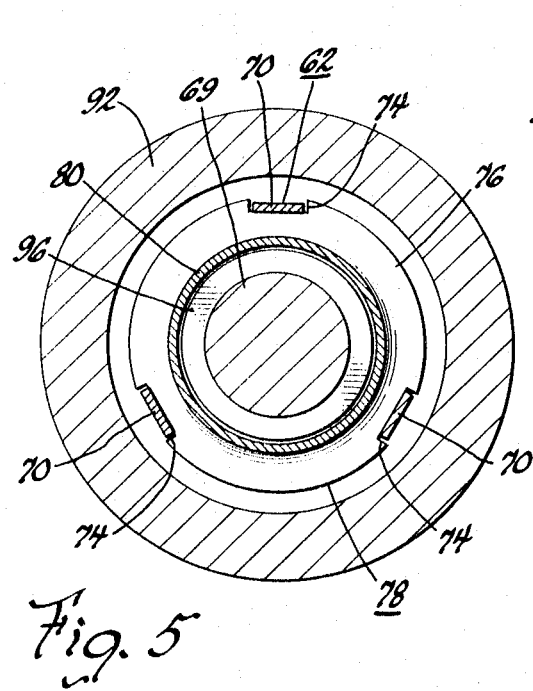
FIGURE 5 is a view in vertical section taken along the line 5—5 of FIGURE 4.
Figure 6:
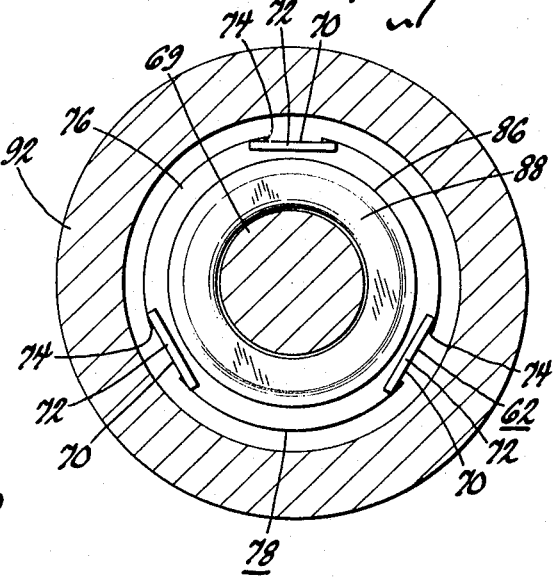
FIGURE 6 is a view in vertical section taken along the line 6—6 of FIGURE 4.

In the embodiment of the invention illustrated in FIGURES 4–6, an annular O-ring sealing element 94 of a suitable resilient material such as rubber is supportingly received within the annular recess 84 for sealingly engaging the shaft 69 directed through the seal assembly. An O-ring retainer element 96 is located in axial juxtaposition with sealing element 94 to supportingly receive one end of a compression spring 98 supported within the outer housing member 62 so that the opposite end thereof is in engagement with the end surface 64 whereby the housing members 62, 78 are biased axially apart and the retainer element 96 is held against the O-ring sealing element 94 to bias it into sealing engagement with the radially inwardly directed portion 82 of inner housing 78.

While the embodiments of the present invention as herein disclosed constitute preferred forms, it is to be understood that other forms might be adopted.

What is claimed is as follows:

A seal assembly comprising, a fixed housing having a recess forming portion thereon, a rotary shaft directed through said recess having means thereon including a rotatable ring seal element, a first fixed housing portion including a radially outwardly directed peripheral edge indexed against the fixed housing and a radially outer annular wall directed axially from said peripheral edge adapted to be press fit within the fixed housing recess, said first housing portion including a second annular, axially directed wall thereon located in spaced relationship with respect to the rotary shaft and radially inwardly of said radially outer wall, a radially directed annular end member on said first housing joining said axially directed walls, a second fixed non-rotatable housing portion having a tubular extension thereon extending axially and located radially inwardly of said second wall of said first housing portion and including one end thereof located in telescoping relationship with the radially inwardly, axially directed wall on said first housing portion, coacting means on said telescoping tubular extension and axially directed wall for preventing relative rotation between said housing portions, said second housing portion including a radially outwardly directed flange on the opposite end of said tubular extension, said radially outwardly directed flange having the peripheral edge thereof bent in the direction of said first housing portion and extending generally axially of said tubular extension thereof, a flexible sealing sleeve located between said radially directed end wall of said first housing portion and said radially directed flange on said second housing portion, a radially inwardly directed edge on each end of said sealing sleeve, and a spring disposed within said flexible sealing sleeve and between said sleeve and said telescoping tubular extension on said second housing portion, said spring having opposite ends thereon engaging said radially inwardly turned edges of said sleeve for biasing said sleeve into tight sealing fixed engagement with said first housing portion at the juncture between said radially outer axially directed wall and said end wall of said first housing portion and with said second housing portion at said axially directed peripheral edge of said radially outwardly directed flange, said axially directed peripheral edge serving to retain said spring against said sleeve edge with said sleeve edge in sealing engagement with said second housing portion, said radially outwardly dircted flange portion of said second housing member having an outer axially facing surface thereon extending from said tubular extension to said axially directed peripheral edge located in rotatably sealing sliding engagement with said ring seal on said rotatable shaft.

References Cited

UNITED STATES PATENTS

| | | | |
|---|---|---|---|
| 2,614,874 | 10/1952 | Helfrecht | 277—86 X |
| 2,297,477 | 9/1942 | Hunn et al. | 277—87 |
| 2,407,218 | 9/1946 | Beier | 277—86 X |
| 2,645,508 | 7/1953 | Payne | 277—43 |
| 2,824,760 | 2/1958 | Gits | 277—40 |
| 3,025,069 | 3/1962 | Harker | 277— 41 X |
| 3,042,414 | 7/1962 | Tracy | 277—87 X |

FOREIGN PATENTS

| | | |
|---|---|---|
| 591,522 | 8/1947 | Great Britain. |
| 618,100 | 4/1961 | Canada. |

SAMUEL ROTHBERG, *Primary Examiner.*

J. S. MEDNICK, *Assistant Examiner.*